April 4, 1967   A. L. SIMMONS ET AL   3,312,422
SATELLITE CONTROL APPARATUS
Filed July 28, 1961
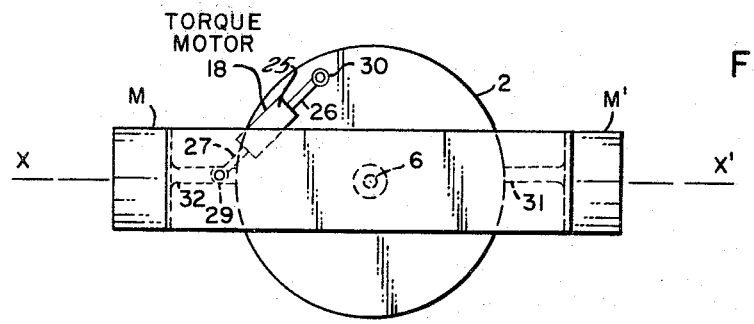
Fig. 1A.
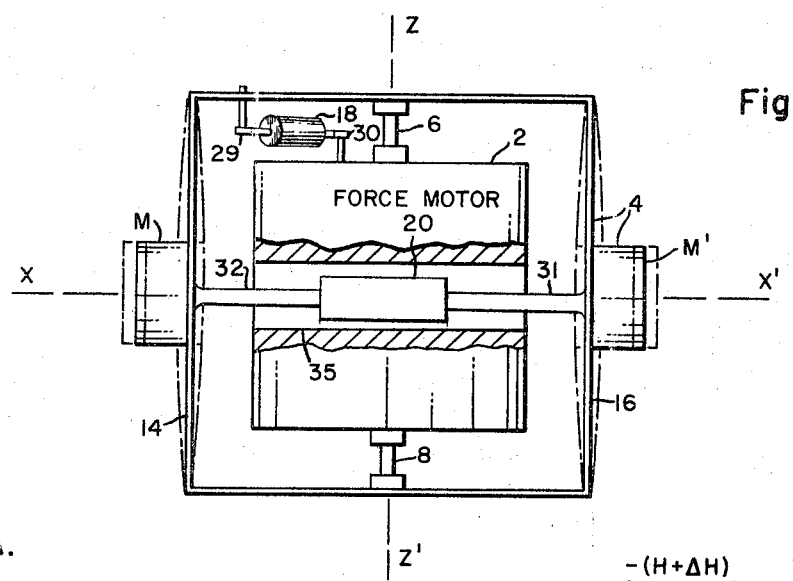
Fig. 1B.
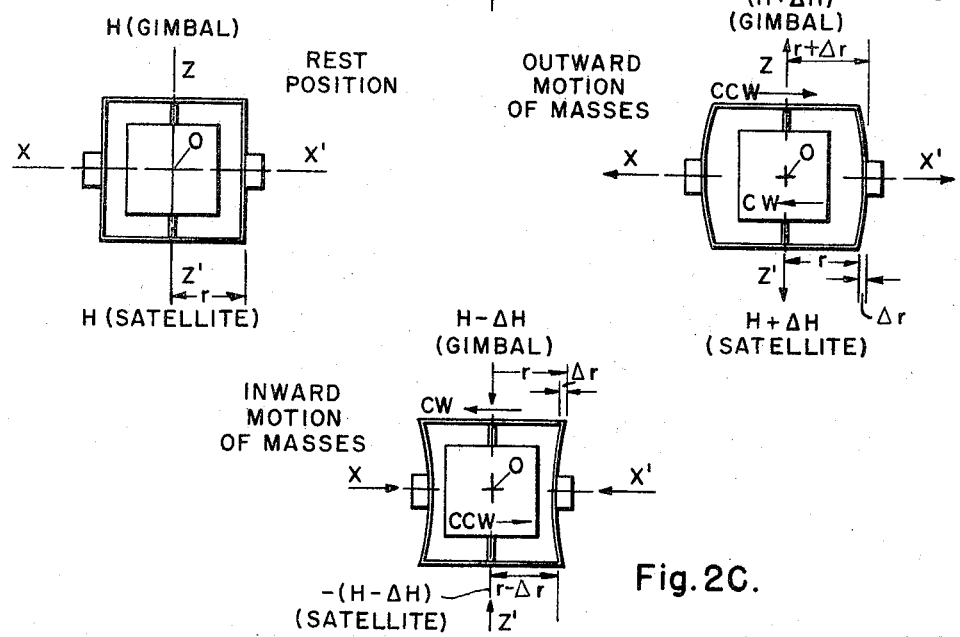
Fig. 2A.
Fig. 2B.
Fig. 2C.

United States Patent Office 3,312,422
Patented Apr. 4, 1967

3,312,422
SATELLITE CONTROL APPARATUS
Arthur L. Simmons, David W. Roese, and John J. Buckley, Baltimore, Md., assignors to Westinghouse Electric Corporation, East Pittsburgh, Pa., a corporation of Pennsylvania
Filed July 28, 1961, Ser. No. 127,675
5 Claims. (Cl. 244—1)

The present invention relates to apparatus for controlling a vehicle in space, and more particularly to apparatus for controlling the orientation or the angular velocity of a satellite in space.

Once a planetary or moon satellite has been placed in orbit it is often required to regulate or change the angular velocity or orientation of the satellite with respect to inertial space. By so controlling a satellite it may be set into rotation; if rotating, its angular velocity may be increased or decreased, or the rotation stopped. Several methods are available for changing the orientation or angular velocity of a satellite. One method is to use peripheral jets mounted on the satellite and then control the satellite by the jettison of mass therefrom. Since the loss of mass cannot be supplemented, this method is not suitable for long term use. Another method, not utilizing the jettison of mass, is to use a wheel which is caused to rotate about an axis when an angular change of the satellite is desired. The angular momentum of the vehicle will always remain constant relative to inertial space about this axis if there is no loss of mass. So the rotation of the wheel will be accompanied by an opposite rotation of the satellite such that the vector sum of the angular moments of the wheel and satellite will not change in magnitude or direction. The disadvantages of this method are that: a rotating wheel will necessitate bearings which will require some type of lubrication; power requirements for a motor drive with bearing friction losses for the wheel must be considered; and possible temperature extremes and the vacuum of outer space present severe operating conditions for rotating a wheel.

It is therefore an object of the present invention to provide new and improved apparatus for controlling the orientation or angular velocity of a satellite in space that is operative in a vacuum, operative within the temperature extremes encountered, and has low power requirements.

It is a further object of the present invention to provide a new and improved apparatus for controlling the orientation or angular velocity of a satellite in space by controllably changing the angular momentum of the satellite.

The present invention broadly provides apparatus for controlling the orientation or angular velocity of a satellate in space wherein a gimbaled member is rotatably mounted with respect to the satellite and is oscillated between predetermined limits, with the moment of inertia of the member varying from a maximum to a minimum value between these limits, so that the angular momentum of the satellite is changed by a given amount for each cycle of oscillation of the member; thus by imparting the change of angular momentum the orientation may be changed or the angular velocity increased or decreased.

These and other objects will become more apparent when considered in view of the accompanying specification and drawing, in which:

FIGURE 1A is a top view of the apparatus embodied in the present invention;

FIGURE 1B is a side elevational view of the apparatus as embodied in the present invention;

FIGS. 2A, 2B and 2C are side schematic views to aid in the explanation of the present invention.

Referring to FIGS. 1A and 1B, a satellite 2 has a gimbaled member 4 rotatably mounted on the satellite 2 through the torsion bars 6 and 8, along the Z–Z' axis. The gimbal member 4 has mounted thereon the masses M and M' through the transverse springs 14 and 16. A torque motor 18 is provided to supply a torque between the satellite 2 and the gimbal member 4 about the common Z–Z' axis of the elements. The torque may, for example, be applied through a movable solenoid of the torque motor mechanically connected to the gimbaled member 4. The torque motor 18 is an actuator that is mechanically mounted between the satellite 2 and the gimbaled member 4 so that it exerts equal and opposite forces on the satellite 2 and the gimbaled member 4. The torque exerted is a function of the force applied and its respective lever arm. One end of the torque motor 18 is mechanically connected through an extensible member 26 and a pivoting joint 30 to the satellite 2. The other end is connected to the gimbaled member 4 by means of the extensible member 27 and the pivoting joint 29. The pivoting joints allow the necessary degrees of freedom to permit the rotation of the satellite 2 relative to the gimbal member 4 about the axis Z–Z'. The torque motor 18 when extended exerts equal and opposite forces and hence equal and opposite torques on the satellite 2 and the gimbaled member 4. With reference to FIG. 1A it can be seen that when the torque motor 18 is extended the satellite 2 will be torqued in the clockwise direction and the gimbaled member 4 in the counterclockwise direction. Further, the torque motor 18 when contracting will conversely torque the satellite in the clockwise direction and the gimbal 4 in the clockwise direction. In each instance a restraining torque will be built up in the torsion bars 6 and 8.

A force motor 20 is provided to oscillate the masses M and M' along the X–X' axis of the gimbal member. The reciprocating forces may be, for example, applied to the masses M and M' through a movable solenoid of the force motor coupled mechanically to the springs 14 and 16. The force motor 20 is connected by suitable extensible members 31 and 32 to the gimbal member 4 and is directly connected thereto along the X–X' axis as indicated in FIG. 1B. Extensible members 31 and 32 are likewise connected respectively to M' and M through the springs 16 and 14 which form part of the gimbal member 4. The satellite 2 includes a clearance space 35 so that the force motor 20 can be disposed between the masses M and M' along the X–X' axis wtihout interferring with the oscillating motion of the gimbal member 4 and satellite 2 about the Z–Z' axis. The forces generated by the force motor 20 on the masses M and M' by the extensible members 32 and 31 respectively are equal in magnitude and opposite in direction. The force motor 20 then acts to oscillate masses M and M' along the X–X' axis. The torque motor 18 thus provides a clockwise or a counterclockwise moment to the gimbal member 4; while the force motor 20 provides a push-pull force along the X–X' axis to the masses M and M', so that both masses are either moving outwardly from the Z–Z' axis or inwardly toward the Z–Z' axis. The torque motor 18 and the force motor 20 are designed to operate at the same frequency. Moreover, for most efficient operation, the masses M and M' and the gimbal member 4 are driven in time coincidence such that the masses M and M' are at their outermost extension at a time when the gimbal member 4 has rotated about the Z–Z' axis a maximum amount, in for example, the clockwise direction; and when the masses M and M' are at their innermost position to the axis Z–Z', the gimbal member 4 is at its maximum, counterclockwise, position about the Z–Z' axis. In other words, the maximum displacement of the masses M and M' in a rectilinear direction along the X–X' axis should coincide in time with the peak amplitude of angular displacement between the gimbal 4 and the satellite 2 about the Z–Z' axis. It is not necessary to restrict the motion such that these maximums coincide in time or phase except where maximum efficiency is required; however, it is necessary that they be of the same frequency.

The maximums or limits are determined in both the rectilinear and angular motions by the characteristics of the respective spring mass systems and the driving devices. In both instances, the maximum amount is determined by the distance that the respective extensible members can be made to move. The torque motor 18 and the force motor may be activated from a control station on Earth through suitably coded signals transmitted to the satellite from Earth.

The torque motor 18 under conditions of maximum efficiency in general is utilized to either start or stop the torsional mode of vibration at the proper time and to provide for any energy losses incurred. Likewise the primary function of the force motor 20 in general is either to start or stop the transverse mode of vibration of the masses M and M' and to provide for any energy losses incurred. A function of the torsion bars 6 and 8 with the aid of the torque motor 18 is to sustain the torsional oscillations of the vehicle. A function of the transverse springs 14 and 16 with the assistance of the force motor 20 is to sustain the transverse vibration of the masses M and M'.

Considering that there are no external moments or couples applied to the satellite 2, then as a consequence the angular momentum of the system, including the satellite 2 and the gimbal member 4, will remain constant relative to inertial space. This implies that the satellite may or may not have an angular velocity. Since angular momentum is a vector quantity both its magnitude and direction will remain constant.

Referring to FIG. 2A, taking the reference position for the gimbaled member to be as shown in these figures, the angular moment of inertia of the gimbaled member 4 may be written as:

$$i = I + \Delta I \sin 2\pi f t$$

where $I$ is the angular moment of inertia of the gimbal member 4 at the reference position of the gimbal member; $\Delta I$ is the maximum change the moment of inertia of the gimbal member 4 about the rotational axis Z–Z'; $f$ is the vibrational frequency of the masses M and M'; and $t$ is time.

Since the angular momentum is the product of the moment of inertia and angular velocity the angular momentum is:

$$h = (I + \Delta I \sin 2\pi f t) W$$

or $$h = H + \Delta H \sin 2\pi f t$$

where $W$ is the angular velocity of rotation of the gimbal member 4 about the Z–Z' axis relative to inertial space; $H$ is the angular momentum of the gimbal member at the reference position; and $\Delta H$ is the maximum change of angular momentum about the axis Z–Z'. For purposes of explanation only, the maximum and minimum values of $\Delta H \sin 2\pi f t$ will be used, i.e. $\pm \Delta H$, which will be assumed to be equal for both polarities. Also it will be assumed that the satellite is not rotating, however, the explanation is equally valid if the satellite were in rotation.

Initially, assume that the torque motor 18 caused the gimbal member 4 to rotate in a counterclockwise direction. The force motor 20 causes the masses M and M' to extend to their maximum extensions from the origin O to the radial distance $r + \Delta r$. The masses M and M' are shown extended in FIG. 2B. The angular momentum of the gimbal member 4 due to the extension of the masses to the distance $r + \Delta r$ is given $-(H + \Delta H)$, shown in FIG. 2B in the upward direction, which is assumed to be the negative direction. The equal and opposite angular momentum of the satellite is then $H + \Delta H$. Due to the action of the torque motor 18, the gimbal member 4 is rotated about the Z–Z' axis in the counterclockwise direction. The satellite 2, due to the equal and opposite reaction is rotated in the clockwise direction about Z–Z'. With respect to inertial space, the angle the satellite rotates through about Z–Z' is a function of the moment of inertia $I_s$ of the satellite about Z–Z'. The gimbal member 4 rotates in the opposite direction through an angle which is a function of the instantaneous moment of inertia $I_G + \Delta I_G$; where $I_G$ is the moment of inertia of the gimbal at the reference position, and $\Delta I_G$ is the increase in gimbal inertia due to the increased radial distance, $r + \Delta r$, of masses M and M' from the Z–Z' axis.

When the torque motor 18 imparts a torque which causes the gimbal member 4 to move clockwise, the satellite 2 then rotates counterclockwise about the Z–Z' axis, as shown in FIG. 2C. At this time, the force motor 20 has caused the masses M and M' to move to their innermost position along the X–X' axis to a position of radius $r - \Delta r$ from the Z–Z' axis. Due to the clockwise rotation and the change of radial position of the masses M and M' the angular momentum of the gimbal member 4 changes in direction and magnitude to $H - \Delta H$, in the downward direction. The satellite's angular momentum must be equal and opposite and so is equal to $-(H - \Delta H)$. The satellite 2 thus rotates through an angle referenced to inertial space in a counterclockwise direction which is a function of its moment of inertia $I_s$; and the gimbal member 4 rotates clockwise through an inertial space referenced angle which is a function of its moment of inertia $I_G - \Delta I_G$: where $-\Delta I_G$ is the decrease in gimbal member moment of inertia due to the decrease in radius of the masses an amount $\Delta r$. The force motor 20 may then return the masses M and M' to their reference position on axis X–X'. Over one cycle as described herein, the clockwise rotation of the satellite 2 is greater than the counterclockwise movement, resulting in a net clockwise angular rotation of the vehicle.

This is then one complete cycle of operation. So adding the angular momentums of the satellite for the cycle we obtain:

$$H + \Delta H - (H - \Delta H) = 2\Delta H$$

the minus sign coming from the arbitrary assumption that the vector pointing toward the top of the figures is the negative direction. Therefore, for one complete cycle of operation the satellite has experienced a total change in angular momentum of $2\Delta H$. The effect of the change in the angular momentum of $2\Delta H$ per cycle when summed over a finite number of cycles will manifest itself in a new angular orientation of the vehicle relative to an inertial reference frame. During the continuous operation of the system the torsional vibration of the satellite 2 and gimbal 4 about the Z–Z' axis and the transverse vibration of the masses M and M' along the X–X' axis of the gimbal system (2) should be at the same frequency and this frequency for improved efficiency may be operated at or near the resonant condition for the respective modes of vibration. The satellite 2 will then undergo a cyclical motion which results in a finite incremental rotation about the Z–Z' axis as its angular momentum is changed over one complete cycle. In order to change the direction of motion the phase of the vibration of the masses is changed by 180°; so that, if the satellite is originally in rotation it may also be stopped by this means.

FIGURES 1A and 1B illustrate a single axis application of the satellite control apparatus described herein. The satellite control apparatus embodied in FIGURES 1A and 1B may be utilized on one, two or three orthogonal axis of a space vehicle to achieve multiple axis orientation control.

Although the present invention has been described with a certain degree of particularity, it should be understood that the present disclosure has been made only by way of example and that numerous changes in the details of construction and the combination and arrangements of parts may be resorted to without departing from the spirit and scope of the present invention.

We claim as our invention:

1. In satellite control apparatus for regulating either one of the angular velocity and orientation of a satellite in space the combination of, a gimbaled member rotatably mounted in relation to said satellite, means connected between said member and said satellite to provide rotation of said member with respect to said satellite in an oscillatory manner between predetermined limits of angular rotation and inertia means acting in cooperation with said member to change the angular moment of inertia of said member in correlation to the angular rotation of said member.

2. In satellite control apparatus for regulating either one of the angular velocity and orientation of a satellite in space the combination of, a gimbal member, means for rotatably mounting said member in relation to said satellite, means for providing rotation of said member in an oscillatory manner between predetermined limits of angular rotation with respect to said satellite, inertia means including a mass which is controllably movable and being operative in cooperation with said member to change the angular moment of inertia of said member in correlation to the angular rotation of said member, and means for driving said inertia means to produce the change of the angular moment of inertia.

3. In satellite control apparatus for regulating either one of the angular velocity and orientation of a satellite in space the combination of, a gimbal member, tension means for rotatably mounting said member on said satellite, means connected between said member and said satellite to rotate said member about an axis in an oscillatory manner between fixed limits of angular rotation with respect to said satellite, and inertia means including a mass connected to said member, means for providing transverse movement of said inertia means to change the angular moment of inertia of said member so that the angular moment of inertia is respectively a maximum and a minimum at the fixed limits of the angular rotation of said member.

4. In satellite control apparatus for regulating either one of the angular velocity and orientation of a satellite in space the combination of, a gimbaled member including tension means rotatably mounted in relation to said satellite torque producing means operably connected between said member and said satellite to rotate said member in an oscillatory manner at a predetermined frequency between fixed limits of angular rotation with respect to said satellite, inertia means connected to said member including a plurality of bodies having a mass which is controllably movable in an oscillatory manner at said predetermined frequency with the direction of movement being traverse to the direction of rotation of said member, means connected to said inertia means for providing controlled movement, said inertia means being operative in cooperation with said member to change the angular moment of inertia of said member from a maximum value when said member is at one limit of angular rotation and to a minimum value when said member is at the other limit so that the angular momentum of said satellite is changed by a given amount for each cycle of oscillation of said member.

5. In satellite control apparatus for regulating either one of the angular velocity and orientation of a satellite in space the combination of, a gimbal member, tension bar means connecting said member and said satellite for rotatably mounting said member on an axis in relation to said satellite, a torque motor to rotate said member in an oscillatory manner between fixed limits with respect to said satellite of angular rotation about said axis at a predetermined frequency, force motor means and inertia means including a plurality of bodies having a mass which is controllably movable in an oscillatory manner at said predetermined frequency by said force motor means to change the moment of inertia of said member in cooperation with said member so that said bodies are respectively at a maximum and minimum distance from said axis when said member is at its limits of angular rotation causing said member to have different moments of inertia depending upon the position of said bodies.

No references cited.

FERGUS S. MIDDLETON, *Primary Examiner.*

CHESTER L. JUSTUS, RALPH D. BLAKESLEE,
*Examiners.*

A. E. HALL, *Assistant Examiner.*